United States Patent
Klosters et al.

(10) Patent No.: US 7,620,135 B2
(45) Date of Patent: Nov. 17, 2009

(54) DATA PROCESSING APPARATUS THAT IDENTIFIES A COMMUNICATION CLOCK FREQUENCY

(75) Inventors: Franciscus Johannes Klosters, Nijmegen (NL); Patrick Willem Hubert Heuts, Nijmegen (NL); Joris Rudolf Beverloo, Nijmegen (NL); Hendrik Bernard Heule, Nijmegen (NL)

(73) Assignee: NXP B.V., Eindhoven (NL)

( * ) Notice: Subject to any disclaimer, the term of this patent is extended or adjusted under 35 U.S.C. 154(b) by 539 days.

(21) Appl. No.: 10/531,397

(22) PCT Filed: Aug. 13, 2003

(86) PCT No.: PCT/IB03/03631

§ 371 (c)(1),
(2), (4) Date: Apr. 14, 2005

(87) PCT Pub. No.: WO2004/036821

PCT Pub. Date: Apr. 29, 2004

(65) Prior Publication Data

US 2006/0013348 A1  Jan. 19, 2006

(30) Foreign Application Priority Data

Oct. 18, 2002  (EP) .................................. 02079341

(51) Int. Cl.
*H04L 7/00* (2006.01)
(52) U.S. Cl. ........................ 375/368; 375/354; 455/502; 327/141; 370/509; 370/510

(58) Field of Classification Search ................. 375/354, 375/368; 370/509, 510; 327/141
See application file for complete search history.

(56) References Cited

U.S. PATENT DOCUMENTS 5,596,582 A * 1/1997 Sato et al. .................... 370/509
2002/0101884 A1 8/2002 Burri et al.

* cited by examiner

*Primary Examiner*—David C Payne
*Assistant Examiner*—Leon Flores

(57) ABSTRACT

A data processing apparatus receives a message containing a sync break interval with a unique bit pattern and a sync field interval identified by the sync break interval. A timing property of the sync field interval specifies the length of bit periods of the message. A clock source circuit supplies a sampling clock signal to define time points for sampling bits from the message. The clock source circuit adapts a frequency of the sampling clock signal to the timing property of the sync field interval. The clock source circuit searches for potential sync break intervals that match the unique bit pattern for a range of bit period values and verifies for each potential sync break interval whether the sync field interval identified by that potential sync break interval specifies a bit period with a duration so that the sync break interval matches the unique pattern for the specified bit period, as a condition prior to supplying the sampling clock signal at the adapted frequency specified by the sync field interval identified by the potential sync break interval. Supply of sampling clock signals is preferably suppressed after an end of a preceding message until said condition is met.

10 Claims, 4 Drawing Sheets

DATA PROCESSING APPARATUS THAT IDENTIFIES A COMMUNICATION CLOCK FREQUENCY

Figure 1:
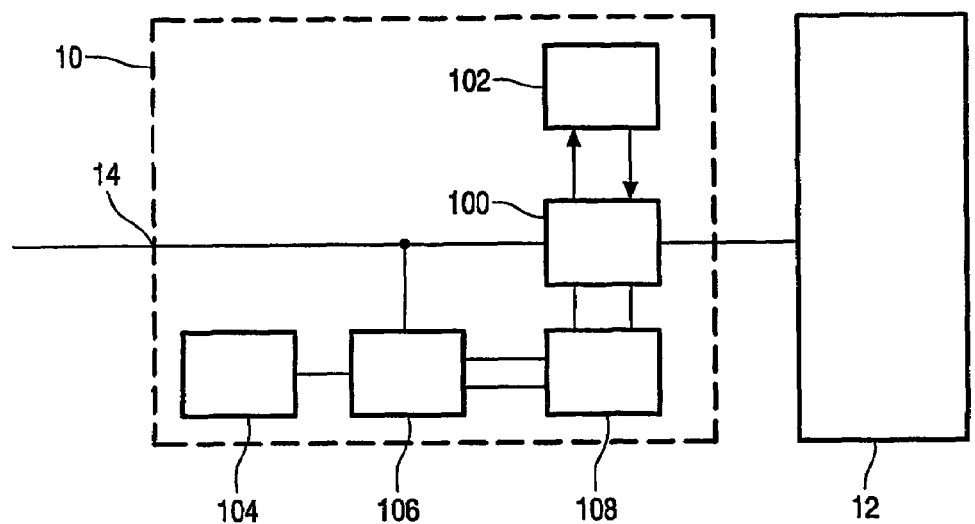

This application is a 371 of PCT/IB03/03631 Aug. 13, 2003.

The invention relates to a data processing apparatus with an input port for receiving a communication signal.

In data processing equipment, data serial bit streams are often used to communicate data between different apparatuses. Successively received bits are formed into data words of for example 8 bits. During reception, sampling of the different bits from the stream is usually performed under control of a clock signal. A clock signal with a predetermined fixed frequency is often used for this purpose, but selection between alternative frequencies is also known. From PCT patent application No. WO9960760 for example, a clock circuit is known that adapts the divisor with which the sampling clock signal is obtained from a master clock to measured characteristics of the communication signal.

Another example of processing equipment that uses adaptable bit periods is equipment that uses the so-called LIN bus protocol. The LIN protocol provides for transmission of a communication signal that contains messages, without transmission of a separate clock signal. Clock signals are produced locally in a receiver of the communication signal. Each message contains a sync field which defines a time interval in which a toggling bit pattern is transmitted. This bit pattern has the bit period that will be used during the message. The sync field allows a receiving circuit to generate a local clock with a correct bit period, usually by selecting one of a number of available bit frequencies.

According to the LIN protocol the sync field is preceded by a so-called sync break that enables the receiver to identify the start of a message and the sync field, which immediately follows the sync break. The sync break contains a unique pattern of bits that cannot occur elsewhere in the messages: a continued low level signal that lasts longer than the separation between successive bytes in the remainder of the message. Thus the sync break functions as a detection interval to determine whether or not a sync field is to follow, and the sync field functions as a measuring interval to measure a bit period.

Such equipment works well when predictable clock signal frequencies are used, with frequencies within a predetermined limited range or within a small number of ranges of frequencies, as in conventional LIN receivers. Problems arise when the clock signal frequency is permitted to vary substantially continuously over a wide range. In this case the duration of a sync break interval at a high clock frequency may equal the duration of a low level of the communication signal at a low clock frequency. When the clock frequency is not known a priori with sufficient accuracy, sync break intervals cannot be distinguished reliably from normal message data. Accordingly, it has been necessary to make use of detection of the end of a message before searching for a next sync break interval, that is, to integrate message processing and frequency selection. This makes receiver circuits more expensive.

Among others, it is an object of the invention to provide for a data processing apparatus that supports detection of sync fields when a communication clock frequency can vary over a wide range, without requiring information about the end of messages.

Among others, it is a further object of the invention to provide for continuous monitoring for the start of a message, in parallel with message reception.

The invention provides for a data processing apparatus according to Claim 1. According to the invention the apparatus searches for combinations of potential sync breaks and sync fields identified by those sync potential breaks, and subsequently verifies whether the potential sync break, which typically precedes its identified sync field, has had a duration that is appropriate for the bit period that is specified by its identified sync field. A sampling clock signal with a bit period adapted to the sync field is applied to sample bits from the message only if it has been found that the duration of the potential sync break is appropriate for the bit period that is specified by its identified sync field. Thus, any bit period may be used.

In the LIN protocol the sync break interval identifies the sync field interval in the sense that the sync field interval immediately follows the sync break interval in the communication signal, so that the location of the sync field interval is clear once the sync break has been found. However, without deviating from the invention, other ways of identifying the sync field interval with the sync break interval may be provided for, such as transmitting the sync field interval immediately preceding the sync break interval, or transmitting the sync field interval after a predetermined number of pulses before or after the sync break interval in the communication signal, as long as the sync field interval can be located on the basis of the location of the sync break interval.

In an embodiment an additional verification is performed by checking whether the internal timing of the sync field corresponds to the adapted bit period. Thus even more reliable detection of the start of a message is ensured.

Preferably the clock source circuit operates in parallel with the reception circuit, proceeding with said searching while said reception circuit is sampling bits from the communication signal. Thus, the risk of missing sync breaks is reduced. Preferably, reception is terminated when a new sync break is detected during reception of a message.

These and other objects and advantageous aspects of the invention will be described using the following figures.

Figure 3:
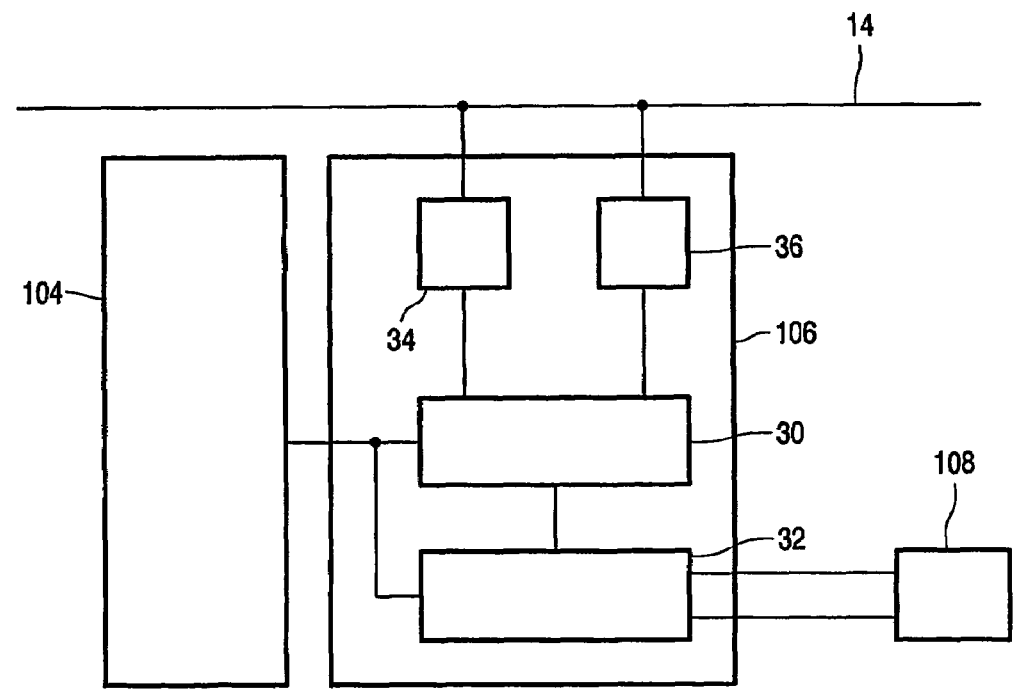
Figure 2:
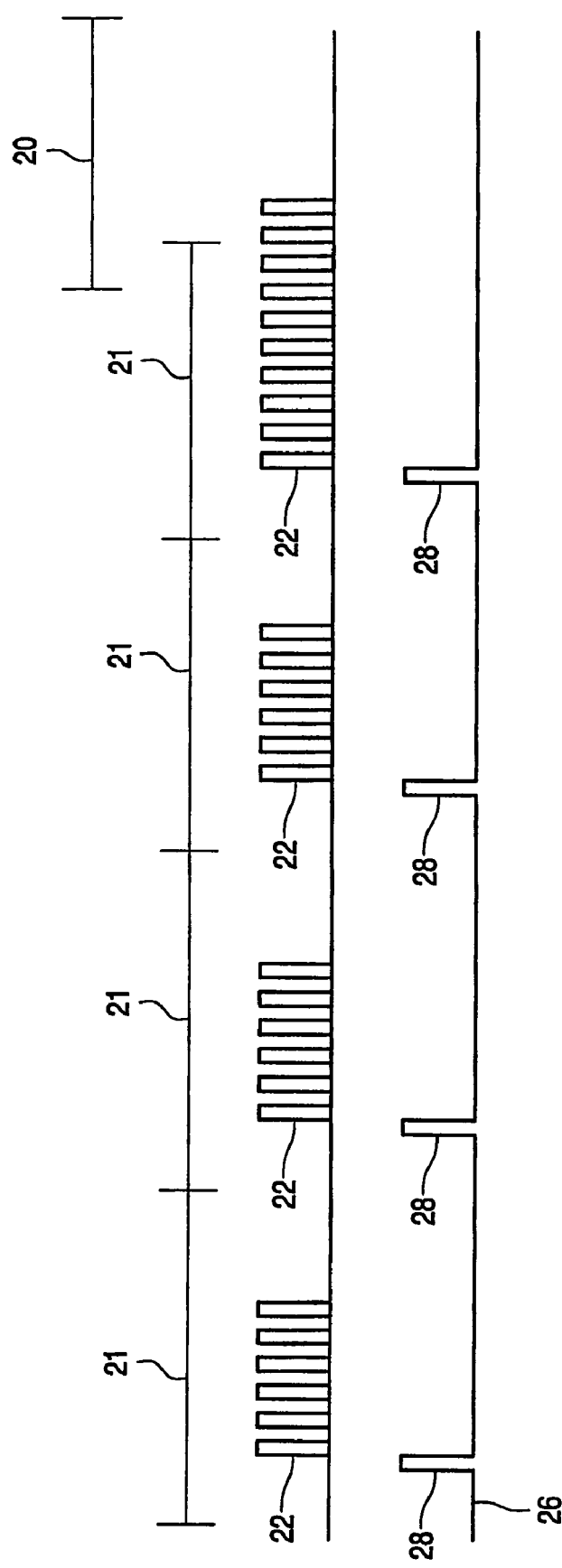
Figure 4:
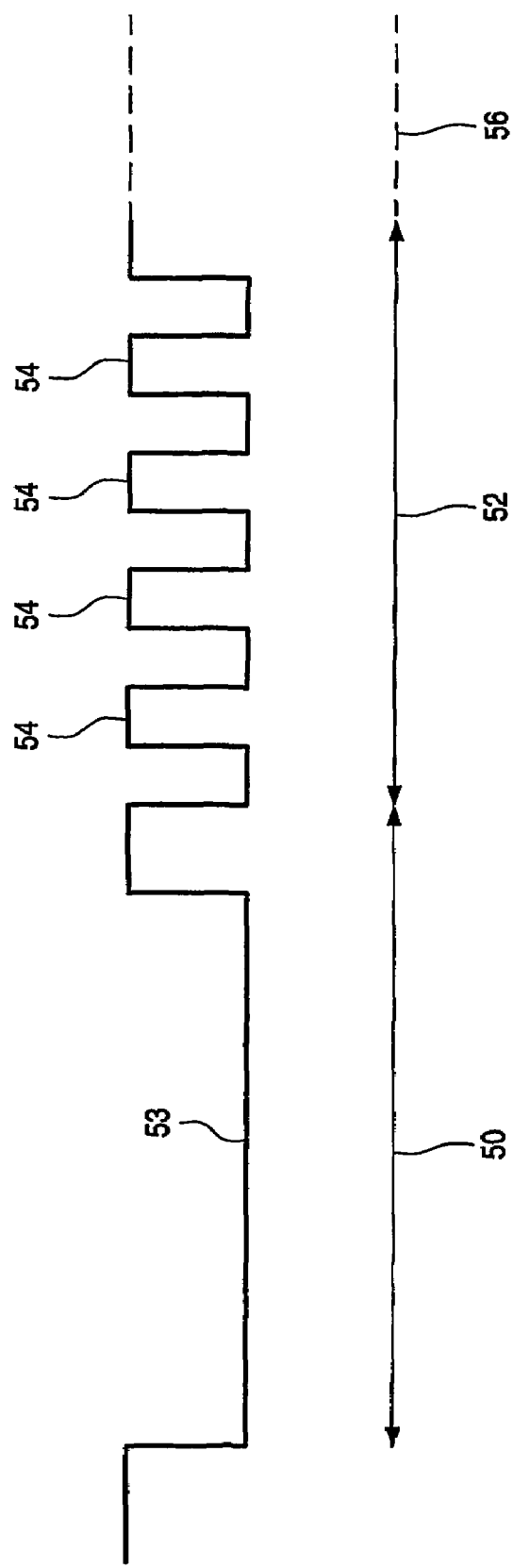
Figure 5:
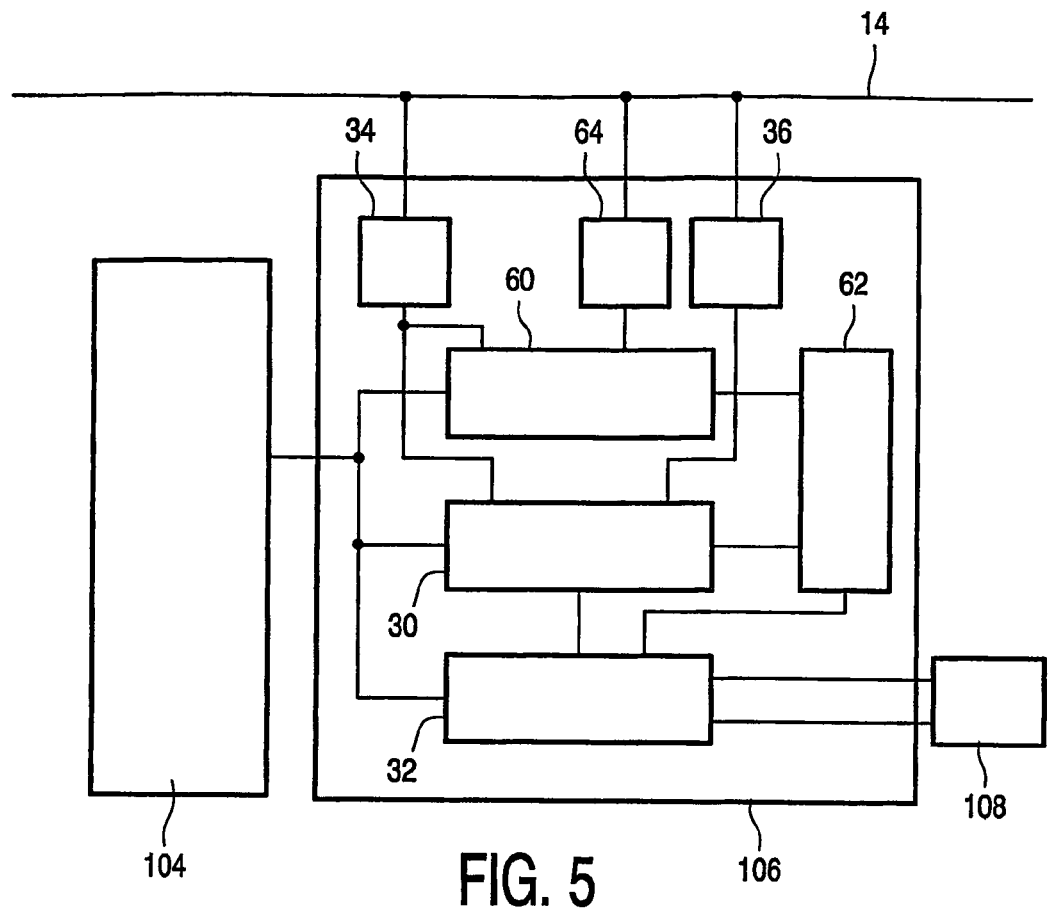
Figure 6:
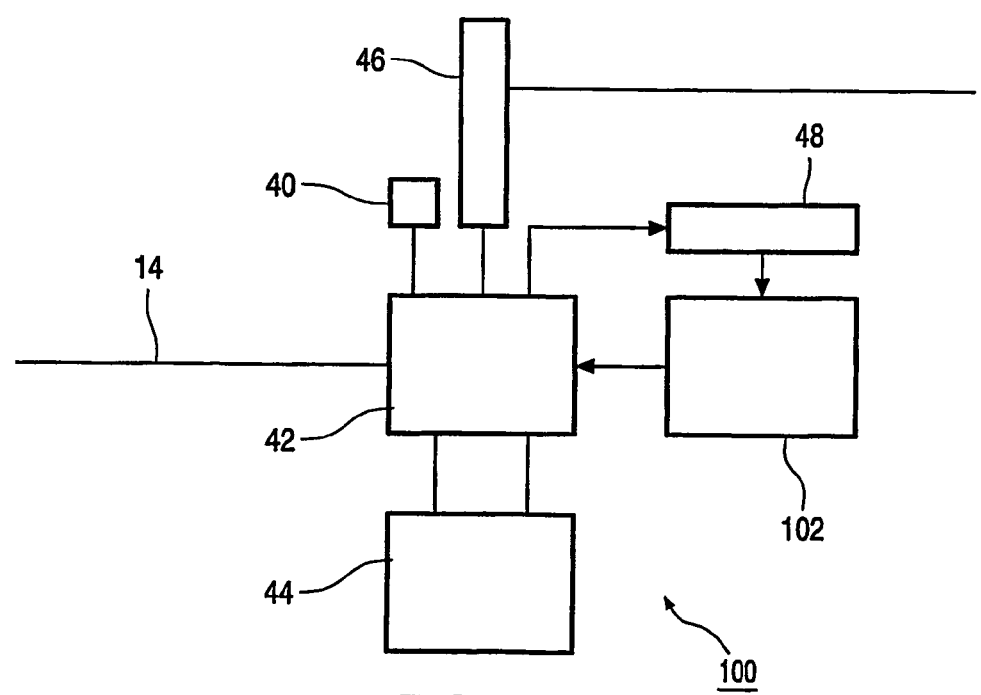

FIG. 1 shows a data processing apparatus.
FIG. 2 shows bursts of instruction execution
FIG. 3 shows a timer circuit
FIG. 4 shows a synchronization part of an input signal
FIG. 5 shows a further timer circuit
FIG. 6 shows a processor circuit FIG. 1 shows a data processing apparatus with an input processor 10 and a further processor 12. Input processor 10 contains an instruction processor 100, an instruction memory 102, a clock circuit 104, a timer circuit 106 and a handshake circuit 108. A communication input 14 of the data processing apparatus is coupled to instruction processor 100 and timer circuit 106. Clock circuit 104 is coupled to timer circuit 106, which in turn is coupled to instruction processor 100 via handshake circuit 108. Instruction processor 100 is coupled to instruction memory 102, handshake circuit 108 and further processor 12.

FIG. 2 shows a trigger signal 26 with pulses 28, bursts 22 of instruction cycles and bit periods 21 and a data word cycle 20 as a function of time. Although FIG. 2 only shows a group of bit periods 21 for the bits in a single data word, it should be understood that messages may contain a succession of such groups, each for a successive data word, and each with their own data word cycle 20.

In operation, a signal that represents temporally successive bits in different bit periods 21 is applied to input 14. Timer circuit 106 generates trigger pulses 28 each time at points in time when the bits are available at input 14. Timing of the trigger pulses 28 is critical only in so far as the trigger pulses 28 are each generated somewhere within the period in which the corresponding bit is known to be stable on input 14.

Furthermore the pulses should have sufficient distance between one another to permit completion of each burst 22 before the next trigger pulse 28. A reception latch may be provided to latch the input bits; in this case the trigger pulses may even be generated outside the periods in which the bits are stable.

In response to the trigger pulses 28, instruction processor 100 fetches a series of instructions from instruction memory 102 and executes each series of instructions in a respective burst 22 of instruction cycles. After a number of such bursts 22, all bits of a data word have arrived at input 14 and have been processed by instruction processor 100. In the last one of said bursts 22, instruction processor 100 outputs the data word to further processor 12 in data word cycle 20. This may be done by outputting all received bits in parallel, or bit serially, in which any clock signal may be used to clock successive bits of the bits.

Dependent on the requirements of the context various types of processing may be performed during the bursts 22. In one example a plurality of parity bits are potentially updated in each burst 22, by successively executing respective instructions to update various parity values in each burst 22, dependent on the value of a received bit and formulas for the different parity bits (the formulas determine how, if at all, a bit at a certain position in a data word contributes to respective parity bits; typically Exclusive Or functions of previous value of respective parity bits and the received bit are computed if the formula for the particular parity bit indicates that the particular received bit contributes to the particular parity bit). A typical series of instructions is

| | |
|---|---|
| f = inp RXD | Read Input Bit into register f |
| m1 = f | Store input bit in location m1 |
| m2 = f + m2 | Update first parity bit in location m2 |
| m3 = f + m3 | Update second parity bit in location m3 |
| wait | Suspend operation until next bit |

(dependent on the sequence number of the bit in the data word different parity bits may be updated or the parity bits in locations m2, m3 may not be updated). When all instructions of a burst 22 have been processed, instruction processing is suspended until the next burst 22 is triggered. Preferably no or substantially no internal signal transitions occur in instruction processor 100 during suspension so as to minimize power consumption. When all input bits have been processed the parity bits may be output to further processor 12, or they may be used by instruction processor 100 to correct signal errors.

Handshaking is used to control the operation of instruction processor 100. Initially timer circuit 106 generates a request signal (typically by raising trigger signal 26). In response to the request signal, instruction processor 100 starts processing a first of a series of instructions in a burst 22. Instruction processor 100 sends an acknowledge signal back to timer circuit 106 which deasserts the request signal in response thereto (typically by lowering the trigger signal 26). Once instruction processor 100 has indicated that it is ready to receive a next request signal, timer circuit 106 may generate a new request signal, but it will do so generally with a delay at a time when a new input bit is available. Subsequent to the trigger signal from timer circuit 106, instruction processor 100 generates a series of request signals for itself to trigger execution of subsequent instructions of the series in burst 22. This repeats until the series of instructions has finished (as indicated by the "wait" instruction in the programming example), whereupon no further request signals are generated by instruction processor 100.

Internally in instruction processor 100, in principle, the handshakes may be passed on so that any sub-circuit that gets involved in instruction execution is activated by handshakes and in turn activates further involved sub-circuits with handshakes. Thus, power consumption is reduced since no sub-circuit needs to produce signal transitions unless this is necessary for execution of a particular instruction. Of course, the invention is not limited to handshaking to ensure suspension of operation. For example, a clocked instruction processor may be used in combination with some form of clock gating, which ensures that no clock signals are applied to instruction processor 100 outside bursts 22. This also reduces power consumption, be it less than with handshaking.

Although the invention has been described in terms of reception of bits by instruction processor 100, it will be understood that, without deviating from the invention, instruction processor 100 may also be arranged to transmit data back via communication input 14 in any or all of bit periods 21. For example, instruction processor 100 may return an acknowledgement in a bit period 21, or it may transmit data in a plurality of bit periods 21 once it has identified from information in preceding bit periods 21 that it is required to do so.

FIG. 3 shows an example of an embodiment of timer circuit 106. This embodiment contains a counter/controller 30, a frequency divider 32, a sync field start detector 34 and a sync field stop detector 36. Sync field start detector 34 and sync field stop detector 36 are coupled to input 14 and have outputs coupled to counter/controller 30. Counter/controller 30 has an input coupled to clock circuit 104 and an output coupled to divider 32. Divider 32 has inputs coupled to clock circuit 104 and counter/controller 30 and an output coupled to handshake circuit 108.

FIG. 4 shows an example of a synchronization part of an input signal from input 14. This synchronization part corresponds to the synchronization part of the LIN protocol, which is publicly known per se. This synchronization part precedes bit periods 21 of FIG. 2. The synchronization part contains a sync break interval 50 and a sync field interval 52. In sync break interval 50 the input signal assumes a low level 53 for a first time interval, after which the signal rises to a high level. The length of sync break interval 50 has been chosen so that it is longer than the length of low levels that can be caused by any bit pattern elsewhere in the message (longer than a byte full of zeros). In sync field interval 52 the input signal contains four pulses 54, in which the input signal first assumes a low level and then a high level. Sync field 52 is followed by a subsequent message interval in which bit periods 21 (not shown) occur. The duration of the bit periods has a predetermined ratio to the duration of sync field interval 52.

In operation the input signal is generated by a transmitter (not shown) and processed by timer circuit 106. Sync field start detector 34 detects the start of sync field interval 52 in the input signal from input 14. Sync field start detector 34 signals counter/controller 30 to reset a count and start counting clock pulses from clock circuit 104 in response to detection. Sync field stop detector 36 detects the end of sync field interval 52 and signals counter/controller 30 to stop counting. Thereupon counter/controller 30 applies a divisor value determined from the counted number of clock pulses to divider 32, which divides the clock frequency by the divisor value. Divider 32 applies clock pulses at the divided frequency to handshake circuit 108 to start bursts 22.

In divider 32 a counter circuit (not shown) may be used which generates a pulse each time when it has counted a set number of clock pulses from clock circuit 104. In this case the set number corresponds to the number of pulses counted by counter/controller 30 divided by a predetermined factor representing the number of bit periods of the sync field. But the invention is not limited to this type of divider 32.

When the sync field contains more than one bit period it is possible to determine the number of clock pulses of clock circuit 106 with a fractional error less than plus or minus one clock pulse. For example when eight bit periods occur in a sync field, the length of the bit period can be determined to within $\frac{1}{8}^{th}$ of a clock period. When divider 30 uses a simple counter, the fractional accuracy is discarded. In a further embodiment, this fractional accuracy is exploited by using a digital oscillator that allows the number of clock periods of clock circuit 106 per bit period to vary so that on average the duration of the bit period more closely corresponds to the bit period that has been measured with fractional accuracy.

Such a digital oscillator may be implemented for example as an adder circuit that adds an increment to a count value in each clock period of clock circuit 104 and generates a pulse indicating a bit period each time when the count value exceeds a threshold, while simultaneously lowering the count by the threshold. In this case the threshold and/or the increment may be set corresponding to a count from counter controller 30, so that the average number of clock periods of clock circuit 104 per bit period equals the fractionally accurate duration of the bit period determined from the sync field by counter controller 30. As a result the number of clock pulses per bit period may vary so that on average the length of the bit period equals the required fractionally accurate bit period.

Clock circuit 106 is preferably designed so that the frequency of the clock pulses from clock circuit 106 is sufficiently high, so that errors in the frequency of the trigger signal pulses 28 are so small that no error occurs during sampling of bits from the input signal. Typically, the errors include timing errors due to an unpredictable relative timing of transitions in the clock signal from clock circuit 106 and transitions in the input signal. The maximum cumulative effect of these errors is an error that is a predetermined number of times (e.g. 10) the duration of the clock period of the clock signal from clock circuit 106. Given a desired accuracy (of for example no more than 1.5% error at the end of a 9 bit data word transmitted with 20 kbit per second) a minimum allowable frequency of clock circuit 104 can be derived (for example 1.4 MHz in this case).

Thus, timer circuit 104 adapts the frequency of trigger pulses 28 to a measured characteristic of the input signal at input 14, to enable instruction processor 100 to process incoming bits with a short burst 22 of instruction executions.

In addition, other characteristics of the input signal may be used to detect whether a data word is supplied, i.e. to determine whether trigger pulses should be generated at all. For this purpose detection of sync break interval 50 may be used, and/or detection of the correct number of pulses 54 with appropriate duration in sync field interval 52. The low signal level 53 in sync break interval 50 persists for a certain minimum duration. This minimum duration stands in a predetermined ratio to the duration of sync field interval 52. As well as for setting the divisor, timer circuit 106 may therefore be arranged to generate successive trigger pulses 28, as controlled by the sync interval, only after a corresponding sync break has been detected.

Timer circuit 106 is able to perform monitoring for sync breaks in parallel with normal processing of the message by input processor 10. Thus, continuous monitoring for sync breaks is possible. No sync breaks will be missed because input processor 10 is busy processing a message.

FIG. 5 shows an embodiment of a timer circuit which checks the duration of one or more of the intervals and pulses 54. In addition to the component of FIG. 3, the embodiment of FIG. 5 contains a sync break counter 60, a sync break end detector 64 and a ratio comparison circuit 62. Sync break counter 60 has a clock input coupled to clock circuit 104, a start input coupled to start detector 34 and a stop input coupled to an output of sync break end detector 64. Outputs of counter/controller 30 and sync break counter 60 are coupled to ratio comparison circuit 62, which has a control output coupled to divider 32.

This embodiment addresses the problem that the minimum duration of the sync break interval 50 cannot be checked when the clock rate is not known with sufficient accuracy in advance. When only small variations in bit-rate are permitted it is possible to set a threshold duration for sync break interval 50 that is longer than the duration of a low level as a result of any normal data pattern even at the lowest possible clock rate, but shorter than the minimum duration of the Sync break for the highest possible clock rate. However, such a threshold duration cannot be found when too much variation in the clock rate can occur.

In the embodiment of FIG. 5, timer circuit 106 detects the presence of a sync break 50 a posteriori in combination with a clock rate measurement. Sync break counter 60 counts the number of clock pulses from clock circuit 104 in time intervals when the signal assumes low level 53, indicating that such an interval could be a sync break interval 50. Counter/controller 30 counts the number of clock pulses during sync field interval 52. The counts from sync break counter 60 and counter/controller 30 are applied to ratio comparison circuit 62 which tests whether ratios between successively determined counts from sync break counter 60 and counter/controller 30 are within a predetermined range that corresponds to a specified minimum duration of synch break interval 50, allowing for sampling errors and clock rate fluctuations. Only if ratio comparison circuit 62 detects such a combination, it signals divider 32 to take over the divisor determined by counter/controller 30.

Ratio comparison circuit 62 can implement the comparison for example by multiplying both counts from a combination by appropriate factors, followed by a comparison of the products. Preferably ratio comparison circuit 62 makes use of pipelining, that is, it has storage elements for storing a number of successively determined counts from sync break counter 60 and compares the oldest count (corresponding to a low signal interval that precedes the end of sync field 52 by a predetermined number of low signal intervals as shown in FIG. 4) with the count from counter/controller 30. Thus, a sync break can be detected using more recent counts from sync break counter 60 if detection fails. However, such pipelined storage is not needed, for example, when very short intervals (such as the intervals between pulses 54) can be eliminated as sync break intervals 50 a priori on the basis of a minimum duration threshold, so that counts for these intervals need not be stored.

As well as for setting the divisor, timer circuit 106 in this embodiment may be arranged to generate successive trigger pulses 28, as controlled by the sync interval, only after a corresponding sync break has been detected.

Although a separate sync break counter 60 and counter/controller 30 have been shown, it will be understood that the same counter might be used for both forms of counting, provided that storage is provided for storing counts of clock pulses of the different time intervals concerned and for combining these counts to detect the ratio between sync break interval 50 and sync field interval 52.

Also timer circuit 106 may be constructed to conduct further checks on the input signal and to make generation of the trigger pulses 28 conditional on a positive result of such a test. Thus, for example timer circuit 106 may check for the presence of sufficient signal level changes due to pulses 54 with the appropriate relative timing in sync field interval 52. If such level changes are absent, detection of the sync break is suppressed, the divisor is not updated and no message is received.

Of course, many alternative embodiments of timer circuit 106 exist. For example, when the length of bit periods 21 is highly predictable, fixed timing of the trigger pulses may be used. Also other characteristics of the incoming signal may be used to adjust the timing, for example a phase-locked loop might be used to synchronize the clock signal to the communication signal. By permitting adaptation of the frequency of the trigger pulses to the incoming signal it is made possible to adapt transmission speed to the amount of data that needs to be communicated, so that power consumption by instruction processor 100 can be minimized.

FIG. 6 shows an embodiment of a one bit wide processor that may be used as instruction processor 100. The instruction processor 100 contains a logic unit 42, a one bit register 40, a data memory 44, a program counter 48 and a data word memory 46. Logic unit 42 is coupled to input 14, one bit register 40, data memory 44, program counter 48 and data word memory 46. Without deviating from the invention, more than one bit register 40 may be provided. Program counter 48 has an output coupled to an address input of instruction memory 102, which in turn has an instruction output coupled to logic unit 42. Data word memory 46 is coupled to further processor 12 (not shown). Data memory 44 may be of any type. In one example a cyclic shift register may be used as a data memory, which shifts the addresses of stored bits by one step each time when a data bit is stored, or in each clock cycle. In this case it may not be necessary to address data memory 44; instead data from a predetermined address may be used. The appropriate data can be accessed by using the appropriate cycle in which the required data is located in the predetermined address.

In operation, instruction processor 100 executes a series of instructions that use one bit operands from register 40, from input 14 and/or from data memory 44 and outputs bits to data word memory 46 (from which data words are supplied to further processor 12). The content of program counter 48 addresses the instructions that must be executed and is normally incremented after each instruction to address a next instruction. Instruction memory 102 supplies the addressed instruction to logic unit 42. Instructions that logic unit 42 is capable of executing include instructions to load one bit data into register 40 from various sources, store instructions to one bit store data, logic instructions, such as And, OR and Exclusive Or instructions with one bit operands from various sources and branch instructions, which may be conditional, to change the content of program counter 48 by an amount specified in the branch instruction.

The instructions that are supplied from instruction memory 102 during operation in a burst 22 include an instruction to read an input bit from input 14 and an instruction to output a bit to data word memory 46. Once all input bits for a data word have arrived and have been output to data word memory 46, data word memory 46 supplies the data word to further processor 12 (not shown). Computed parity bits may be added to the data word. In principle all bits of the data word may be supplied from data word memory 46 to further processor 12 in parallel, but of course serial transport may be used as an alternative.

A one bit wide operand processor has the advantage that it provides the flexibility of programming at the cost of relatively little circuitry. This comes at the cost of low processing power, making it necessary to execute a relatively large number of instructions to execute specific operations as compared to the number of instructions needed by multi-bit operand processors. However, because processing is spread over bursts 22, for each incoming bit only a relatively small number of instructions need be executed at a time in each burst 22. Thus it is possible to process the incoming data programmably with a one bit operand processor.

Of course the invention is not limited to the use of the programmable one bit operand processor of FIG. 6. Other types of programmable one bit operand processors may be used, or even programmable multi-bit operand processors, although the latter will increase the complexity of the circuit.

The invention claimed is:

1. A data processing apparatus, for receiving a communication signal that comprises a message containing a sync break interval with a unique bit pattern, the message containing a sync field interval identified by the sync break interval, a timing property of the sync field interval specifying a length of bit periods of the message, the apparatus comprising:
   an input port for receiving the communication signal;
   a reception circuit for sampling and processing bits from the message;
   a clock source circuit for supplying a sampling clock signal to the reception circuit to define time points for said sampling, the clock source circuit being arranged to adapt a frequency of the sampling clock signal to the timing property of the sync field interval, the clock source circuit being arranged to search for potential sync break intervals that match the unique bit pattern for a range of bit period values, the clock source circuit verifying for each potential sync break interval whether the sync field interval identified by that potential sync break interval specifies a bit period with a duration so that the sync break interval matches the unique pattern for the specified bit period, as a condition prior to supplying the sampling clock signal at the adapted frequency specified by the sync field interval identified by the potential sync break interval, wherein the supply of the sampling clock signal is suppressed after an end of a preceding message until said condition is met.

2. A data processing apparatus according to claim 1, wherein said unique pattern contains a repetition of a same bit value for more than a maximum number of bit periods during which the same bit value is permitted to be repeated during a remainder of the message.

3. A data processing apparatus according to claim 1, wherein the clock source circuit operates in parallel with the reception circuit, proceeding with said searching while said reception circuit is sampling bits from the communication signal.

4. A data processing apparatus according to claim 1, wherein the clock source circuit comprises a local clock circuit for generating a local clock signal, counter means for counting respective first numbers of periods of said local clock signal that occur in the potential sync break intervals and respective second numbers of periods of the local clock signal that characterize the timing property of the sync field intervals identified by the potential sync break intervals and a comparison circuit for comparing each time a combination of the first and a second number of a respective one of the potential sync break intervals and the sync field interval identified therewith, the comparison circuit outputting an enabling signal to enable supplying the sampling clock signal at the adapted frequency when a ratio between the first and second number in a combination is in a predetermined range.

5. A method of sampling data from a communication signal in a data processing apparatus, wherein the communication signal comprises a message containing a sync break interval with a unique bit pattern, the message containing a sync field interval identified by the sync break interval, a timing property of the sync field interval specifying a length of bit periods of the message, the method comprising
   supplying a sampling clock signal to define time points for sampling bits from the message, said supplying comprising:
   searching for potential sync break intervals that match the unique bit pattern for a range of bit period values,
   verifying for each potential sync break interval whether the sync field interval identified by that potential sync break interval specifies a bit period with a duration so that the sync break interval matches the unique pattern for the specified bit period,
   supplying the sampling clock signal at a frequency adapted to the timing property of the sync field interval on the condition that the sync break interval matches the unique pattern for the specified bit period, wherein the supply of the sampling clock signal is suppressed after an end of a preceding message until said condition is met.

6. The method of claim 5, further comprising verifying whether one or more internal intervals between communication signal level changes in said sync field interval have durations corresponding to the bit period specified by the sync field interval as a further condition prior to supplying the sampling clock signal at the adapted frequency specified by the sync field interval.

7. A data processing apparatus configured to receive a communication signal that comprises a message that contains a sync break interval with a unique bit pattern, the message containing a sync field interval identified by the sync break interval, a timing property of the sync field interval specifying a length of bit periods of the message, wherein the apparatus comprises:
   an input port to receive the communication signal;
   a reception circuit to sample and to process bits from the message;
   a clock source circuit to supply a sampling clock signal to the reception circuit to define time points for the sampling, wherein the clock source circuit, as a condition prior to supplying the sampling clock signal at the adapted frequency specified by the sync field interval identified by the potential sync break interval, is further configured to adapt a frequency of the sampling clock signal to the timing property of the sync field interval, to search for potential sync break intervals that match the unique bit pattern for a range of bit period values, to verify for each potential sync break interval whether the sync field interval identified by that potential sync break interval specifies a bit period with a duration so that the sync break interval matches the unique pattern for the specified bit period, to verify whether one or more internal intervals between communication signal level changes in said sync field interval have durations corresponding to the bit period specified by the sync field interval, and to suppress the supply of the sampling clock signal after an end of a preceding message until said condition is met.

8. A data processing apparatus according to claim 7, wherein said unique pattern contains a repetition of a same bit value for more than a maximum number of bit periods during which the same bit value is permitted to be repeated during a remainder of the message.

9. A data processing apparatus according to claim 7, wherein the clock source circuit operates in parallel with the reception circuit, proceeding with said searching while said reception circuit is sampling bits from the communication signal.

10. A data processing apparatus according to claim 7, wherein the clock source circuit comprises a local clock circuit for generating a local clock signal, counter means for counting respective first numbers of periods of said local clock signal that occur in the potential sync break intervals and respective second numbers of periods of the local clock signal that characterize the timing property of the sync field intervals identified by the potential sync break intervals and a comparison circuit for comparing each time a combination of the first and a second number of a respective one of the potential sync break intervals and the sync field interval identified therewith, the comparison circuit outputting an enabling signal to enable supplying the sampling clock signal at the adapted frequency when a ratio between the first and second number in a combination is in a predetermined range.

* * * * *